United States Patent [19]

Gomez Anton et al.

[11] Patent Number: 5,393,853
[45] Date of Patent: Feb. 28, 1995

[54] HYDROGELS OF HETEROCYCLIC POLYMER, METHOD OF OBTAINING THEM, AND THEIR USE AS INSOLUBLE PH-REGULATING PELLETS

[75] Inventors: Ma Rosa Gomez Anton; Ines F. de Pierola; Elena Morales Lujan; Ma Jesus Molina Lorenzo, all of Madrid, Spain

[73] Assignee: Universidad Nacional de Educacion A Distancia, Madrid, Spain

[21] Appl. No.: 30,308

[22] PCT Filed: Jul. 28, 1992

[86] PCT No.: PCT/ES92/00057
§ 371 Date: Mar. 29, 1993
§ 102(e) Date: Mar. 29, 1993

[87] PCT Pub. No.: WO93/03077
PCT Pub. Date: Feb. 18, 1993

[30] Foreign Application Priority Data

Aug. 10, 1992 [ES] Spain .................................... 9101767

[51] Int. Cl.$^6$ .................................................. C08F 26/06
[52] U.S. Cl. .................................. 526/263; 526/262; 526/306; 526/307.1; 526/307.3; 526/310; 526/312
[58] Field of Search .................................. 526/262, 263

[56] References Cited

U.S. PATENT DOCUMENTS

| | | |
|---|---|---|
| 3,954,682 | 5/1976 | Fein .......................................... 521/55 |
| 4,058,491 | 11/1977 | Steckler . |
| 4,066,524 | 1/1978 | Phalangas .......................... 526/263 |
| 4,576,973 | 3/1986 | Keil .................................... 521/149 |
| 5,232,603 | 8/1993 | Denzinger .......................... 210/698 |

FOREIGN PATENT DOCUMENTS 0134921 5/1987 European Pat. Off. .
2010746 11/1969 France .

OTHER PUBLICATIONS

Fernbach and Hubert, Compt. Rend. 131, 293 (1900).
Eduard J. King, Acid–Base Equilibria, Pergamon Press, Oxford, 1965.
Roger G. Bates, Determination of Ph, Theory and Practice, Wiley, New York, 1964.
D. D. Perrin, Boyd Dempsey, Buffers for Ph and Metal Ion Control, Chapman and Hall, London, 1974.

Primary Examiner—Fred Zitomer
Attorney, Agent, or Firm—Brumbaugh, Graves, Donohue & Raymond

[57] ABSTRACT

Hydrogels presented in the form of pellets which are capable of regulating, without dissolving, any pH of an aqueous solution so as to convert it to a pH of 7. These pellets can be removed from the solution at any time without this modifying the pH, and once washed, can be used again. The velocity of buffering depends on the initial pH and can be controlled by modifying the mass and the composition of the pellets. They are obtained by copolymerization of a vinyl-heterocyclic comonomer and a divinyl comonomer in an aqueous solution at a temperature of close to 60° C., in an inert atmosphere. By adjusting the proportion of crosslinking agent and the concentrations of comonomers, the crosslinking of the hydrogel is regulated in accordance with the intended use of the product.

2 Claims, 3 Drawing Sheets

HYDROGELS OF HETEROCYCLIC POLYMER, METHOD OF OBTAINING THEM, AND THEIR USE AS INSOLUBLE PH-REGULATING PELLETS

FIELD OF THE ART

Hydrogels of polyvinylimidazole polymers capable of regulating the pH of an aqueous solution without dissolving.

STATE OF THE ART

The buffer concept dates from the beginning of this century [Fernbach and Hubert, *Compt. Rend.* 131, 293 (1900)]. Since that time, a large number of buffers have been developed.

The buffers marketed at the present time have two major drawbacks. The most important is that they add to the system material which may interfere with measurements carried out on it (for instance, spectroscopic measurements) and which often must then be isolated. The volatile buffers were up to now the only answer to this problem, but they do not represent the absolute solution thereof since the necessity of heating in order to evaporate it also entrains risks for the system and, furthermore, the pH may vary as the buffer evaporates.

Another great inconvenience is that they add ionic strength and, accordingly, decrease the activity of the species of ion in solution and furthermore, once the medium has been buffered, if the system is diluted its pH changes as a result in the change in $pK_a$ with the ionic strength.

A few buffers have a $pK_a$ which varies greatly with the temperature and, accordingly, it is necessary to thermostat the system. The variation of $pK_a$ may be up to 0.03 units per degree.

The references which are cited below contain descriptions of a large number of buffers which attempt to palliate separately for each of the problems which we have commented on:

Eduard J. King, *Acid-Base Equilibria*, Pergamon Press, Oxford, 1965.

Roger G. Bates, *Determination of pH, Theory and Practice.*, Wiley, New York, 1964.

D. D. Perrin, Boyd Dempsey, *Buffers for pH and Metal Ion Control*, Chapman and Hall, London, 1974.

Similarly, in the publications of the commercial companies which sell this type of products (Carlo Erba, Fluka, Sigma-Aldrich, Alfa, etc.) a wide range of soluble pH regulators is listed. However, none of these publications, and none of the references cited above, even mentions the existence of insoluble pH regulators such as those described here, or the possibility of regulating the pH by this procedure. Nor have we found any patent which makes reference to solid or pellet buffers. However, these buffers which we present here represent the simultaneous solution for all the abovementioned problems since they do not act by being dissolved or incorporated in the system, but are simply submersed in it.

INTRODUCTION

A pH regulator or buffer is a substance, the presence of which increases the amount of acid or alkali which it is necessary to add in order to produce a change of one unit of pH. Stated in simpler terms, a pH regulator is a substance which, added to a solution, has the result that the pH of the solution scarcely changes even if acids or bases are also added in concentrations below a certain limit.

For example, when 1 mL of a 1N solution of HCl or NaOH is added to one liter of pure water, its pH varies by 4 units; however, if we add it to one liter of an aqueous solution of 0.05 M imidazole hydrochloride and 0.047 M imidazole, the pH changes only by 0.02 units.

Every buffer regulates to a given pH or a certain narrow range of values of pH which are characteristic of the system and are related to the $pK_a$ of its acid-base equilibrium.

The fields of application of buffers are very varied since there are many chemical and biological systems which involve acid-base equilibriums and they therefore depend critically on the pH of the medium. The buffers are used to control the velocity and the yield in organic synthesis reactions. In industrial and analytical chemistry, the control of pH is essential in precipitation reactions and in the control of the electrodeposition of metals. Buffers are also necessary for the stardardisation and control of reactions in laboratory research work, particularly in the field of biology where it is desired to reproduce physiological conditions.

The efficiency of a buffer depends on:

its opposition to the change of pH by addition of an acid or a base, that is to say, its buffering capacity $\beta$ the change of pH of the system by dilution thereof or the effect of its contribution to the ionic strength of the medium the effects of addition of neutral salts and of temperature on the $pK_a$ of the buffer.

The buffering capacity of a pH regulador ($\beta$) at a given pH is the derivative of the added concentration of strong acid or base with respect to the pH. It is the inverse of the slope of the neutralisation curve (pH against concentration of titrant) and reaches its maximum value when $pH = pK_a$ of the buffer:

$$\beta_{max} = 0.576\ c$$

c being the total concentration of buffer. The typical values of this quantity are less than 0.05, which corresponds to values of c close to 0.1 M, which are enormously high.

BRIEF DESCRIPTION OF THE INVENTION

The present invention refers to hydrogels of polyvinylimidazole, which are obtained in accordance with an original process of crosslinking polymerisation, which have the property of taking up hydronium ions from the aqueous medium or giving them up in accordance with the pH of this medium, tending to shift, at the end of a sufficient period of time, the pH to a value of 7.

The said property can be diagrammatically shown in accordance with the following chemical reactions, in which RN represents the polymer, the underscoring indicating that it is a solid phase.

First of all, the polymer, in an aqueous medium, is hydrated in accordance with the equilibrium

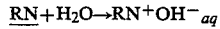

The hydrogel, in acid medium, takes on hydronium ions:

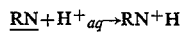

while in basic medium it gives up hydronium ions:

$$RN^+H \rightarrow \underline{RN} + H^+_{aq}$$

Due to the crosslinking obtained by the method of synthesis which will be described in detail further below, the polymer swells but is insoluble in water, which constitutes an essential characteristic of the present invention.

Neither the specific form of obtaining the synthesis of this crosslinked polymer nor the specific action of regulation of the pH of the medium which has been explained above is described in any of the references indicated.

DETAILED DESCRIPTION OF THE INVENTION

The pellets which are the object of the present invention are hydrogels of polyvinylimidazole which are obtained by radical copolymerisation of vinylimidazole and a divinyl comonomer. Under given conditions of obtaining them, these hydrogels are sufficiently consistent and can be used in pellet form.

If it is desired to bring an acid solution to a pH of 7, it is sufficient to add the hydrogel pellet by means of forceps and to wait a certain amount of time which depends on the difference between the initial pH and the final pH, the conditions of obtaining the gel, and the mass of the pellet in relation to the volume of the solution.

The regulation time can be controlled; it varies between a few minutes or a few hours, depending on the conditions mentioned above. Once the pH of the solution has been regulated, the pellet can be removed again by the forceps or by decantation, without the system suffering any change.

The possibility of controlling the velocity of the change of pH means that we can obtain a final pH not only of 7 but of any intermediate value, by merely removing the pellet at the time that the solution reaches the desired pH.

The main advantages of these buffers as compared with those already in existence are as follows:

They can be removed from the system at any stage of the regulation process by simply removing them with forceps or by decantation, without this in any way changing the pH of the system.

They do not contribute any ionic strength but at the same time their regulating activity is compatible with any ionic strength which the system possesses.

They do not interfere with any type of measurement since they are simply submersed in the system, and not incorporated in it by solution or suspension.

They do not regulate instantaneously but at the desired velocity and, accordingly, the process of regulation can be interrupted at any intermediate value of the pH between the initial value and a pH of 7.

They can regulate practically any initial pH since they have not limitations as to solubility and pellet which are already saturated can be replaced by other clean ones, or by the same pellet which has been regenerated by simply washing it with distilled water.

They are compatible with organic media such as methanol.

They are cheap and recyclable.

Synthesis

This consists of the radical polymerisation of a vinyl-heterocyclic monomer with five-membered or six-membered rings, or condensed rings thereof with at least one nitrogen atom, such as N-vinylimidazole, or a derivative thereof, and a divinyl comonomer such as N,N'-methylene-bis-acrylamide, initiated with a suitable radical initiator such as azobisisobutyronitrile (AIBN). The reaction mixture formed by an aqueous solution of vinylimidazole, the crosslinking agent and the initiator must be placed in the mould for the pellet (made of a suitable inert material such as glass for instance) which, in an inert atmosphere, is heated to about 80° C. for a certain amount of time until the reaction is complete. The gel obtained must be washed in order to eliminate the soluble products contained therein, which might contaminate the medium, the pH of which it is desired to regulate.

The mass of the pellet swollen in pure water is about 10 times the mass of the dry pellet and depends on its composition, that is to say on the total concentration of comonomers and the proportion of crosslinking agent used in the reaction mixture.

Properties of the Product

When the pellets are placed in contact with a solution of acid pH, the protons diffuse towards the inside thereof, guided by the difference in osmotic pressure and, once within the gel, they protonise the imidazole groups. The degree of swelling of the gel increases with the degree of protonation.

The buffers which we propose have a buffering capacity which is 15% greater than that of a similar compound of low molecular weight in identical concentration, and its buffering velocity depends on the initial pH, the composition of the gel, and its mass.

FIG. 1 illustrates the influence of the mass of the buffer pellet, expressed as effective concentration, $C_{ef}$ (mass in grams of dry pellet per liter of solution the pH of which it is desired to regulate). The final pH of the process is approximately the same but the velocity of the regulation (V.R.) or slope of the pH curve with respect to time in the initial stage is directly proportional to the mass of the pellet as shown in Table I.

TABLE I

| Velocity of regulation (V.R.) of the pH of an aqueous $10^{-3}$M HCl solution with different pellets of 1 mm diameter, identical composition ($C_T$ = 40.0 g/100 mL and C = 2.0%) and different effective concentration ($C_{ef}$). | |
|---|---|
| V.R. (min$^{-1}$) | $C_{ef}$(g · L$^{-1}$) |
| 0.17 | 12.5 |
| 0.33 | 25.0 |

FIG. 2 shows the influence of the composition of the pellet on the regulation velocity. It can be modified by varying both the total concentration of comonomers ($C_T$ in g/100 mL) and the proportion of crosslinking agent (C in % by weight) in the reaction mixture. These variables also modify the elastic properties of the gel which are suitable when the proportion of crosslinking agent is between 2% and 5% by weight of N,N'-methylene-bis-acrylamide and the total concentration is within the range of 10% to 40% weight/volume. In Table II a few values for the regulation velocity of gels of different composition are given.

TABLE II

Velocity of regulation (V.R.) of the pH of an aqueous $10^{-5}$M HCl solution with pastilles of 1 mm diameter, effective concentration 15 g/L and with different compositions determined by the C. In all cases, $C_T = 25\%$.

| V.R. (min$^{-1}$) | C (%) |
|---|---|
| 0.20 | 4 |
| 0.34 | 2 |

The influence of the initial pH on the velocity of regulation is set forth in FIG. 3 and in Table III. There are practically no limitations for the initial pH of the solution which it is desired to regulate since when a pellet shows saturation, that is to say hardly modifies the pH of the solution with time, there are two possibilities: remove it, wash it and return it, or simply replace it by another. In this way we can stepwise convert a solution of pH =1 into a solution of pH=7.

The regulation velocity depends on the size of the pellet. This is illustrated in FIG. 4 and in Table IV.

For solutions of a pH of less than 3 a very high effective concentration would be necessary in order to reach a pH of 7 in a single step. In this case, it is advisable to effect the process in two steps, as shown in FIG. 5. In the first, the pH would change from 2 to 5 in one hour; at this time, the pellet used is withdrawn and replaced by a new one which transforms the pH from 5 to 7 in 20 minutes.

TABLE III

Velocity of regulation of the pH of various solutions with different initial pH, with pellets of 1 mm diameter, characterised by having an effective concentration of 12.5 g/L, C = 2% and $C_T$ = 40.0 g/100 mL.

| V.R. (min$^{-1}$) | pH$_i$ |
|---|---|
| 0.14 | 3.2 |
| 0.20 | 4.2 |
| 0.22 | 5.2 |

TABLE IV

Velocity of regulation (V.R.) of the pH of an aqueous $10^{-4}$M HCl solution with different pellets of identical composition ($C_T$ = 40.0 g/100 mL and C = 2.0%) and different diameter.

| V.R. (min$^{-1}$) | Diameter (mm) |
|---|---|
| 0.22 | 1 |
| 0.03 | 10 |

Applications

There is given below, without any attempt to be exhaustive, a list of the possible applications, other than the buffering of solutions, of the gels obtained in accordance with the present invention.

In preparative systems of any type in which it is necessary to eliminate the buffer after the reaction without needing to heat, lyophilise or subject the system to any process which takes time or involves risks for the stability of the compound which it is desired to obtain.

For systems on which it is necessary to make spectroscopic measurements which may be interfered with by the absorption of a given wavelength of the soluble buffer.

As support in electrophoresis and chromatography of exchange of proteins, in which the double function of support and buffer is satisfied with without affecting the determination due to its immutability.

In systems in which a high precision in the pH regulation is necessary and which therefore require large amounts of buffer of conventional type with the consequent problems of cost, solubility, ionic strength, etc., since the buffer which is the object of the present invention gives no ionic strength and has no solubility problems.

In systems in which it is necessary to control the pH at a given velocity and not instantaneously because, by regulating the mass and its composition (total concentration and percentage of crosslinking agent) the desired velocity is obtained.

In the pharmaceutical industry, where it is frequently necessary to effect and extraction of an aqueous medium with an organic solvent while controlling the pH, but without the buffer being extracted, since these buffers are insoluble.

In order to prevent corrosion in industrial boilers.

In disposable nappies for babies.

In soft lenses of neutral pH.

In the fermentation industry.

For maintaining the pH of systems close to neutrality such as fishbowls, swimming pools, etc.

EXAMPLE 1

It is desired to change the pH of 40 mL of solution from a pH of 3 to 7 in 30 or 60 minutes.

This presupposes a velocity of variation of pH of 0.13 min$^{-1}$ or 0.06 min$^{-1}$ in the first and second cases respectively. These values correspond approximately to those which give the composition of Table III:

2% crosslinking agent

40% total concentration of comonomers.

Therefore, in order to synthesise the pellet, one proceeds as follows: 0.08 g of BA (N,N'-methylene-bis-acrylamide, of Eastman Kodak) and 0.015 g of AIBN (azobisisobutyro-nitrile, of Merck) are weighed out and dissolved in 4.0 g of N-vinylimidazole (from Aldrich). This solution is added to 6 mL of water in a test tube and nitrogen is then bubbled through for 5 minutes. Thereupon the tube is sealed and placed in an oven which has been previously heated to 80° C., where it must remain for 2 hours.

After that time, the gel formed is removed from the tube and placed in a bath of 50 mL of distilled water which is changed regularly in order to obtain the gel washed free of traces of unpolymerised vinylimidazole and soluble polymer.

At this time, the gel is already ready to be used. It only remains to determine the mass of the pellet which gives rise to the desired regulation velocity, with the aid of Table I.

If the volume of the solution the pH of which we desire to convert from pH 3 to pH 7 in 30 minutes is 40 mL, the effective concentration of the buffer must be 12.5 g/L and therefore we must weigh out 0.5 g of dry gel or else 1.5 g of gel swollen in distilled water. If, on the other hand, it is desired to increase the regulation time to one hour, the effective concentration must be 6 g/L, and therefore 0.25 g of dry gel or 0.75 g of swollen gel must be weighed out.

The desired mass of the gel is taken, divided up until the pellets are about 1 mm in diameter, and introduced into the solution to be regulated. The pH of the solution over the course of time is then determined.

Once the process has been ended, the gel is removed by decantation and placed in a bath of distilled water in order to be reused subsequently.

EXAMPLE 2

It is desired to maintain a solution at a pH of 7 without variation, that is to say, with a rapid regulation which corrects the effect of dissolution of $CO_2$ or the like.

In this case, it is of interest to use a pellet of $C_T=40$ g/100 mL with $C=2\%$, a diameter of 10 mm, and with an effective concentration of 5 g/L. The synthesis and the handling of the gel are identical to that of the preceding example.

EXAMPLE 3

It is desired to convert a solution from a pH of 2 to a pH of 7. It would require an excessively large, effective concentration in order to effect this regulation rapidly in a single step, so that it is preferable, first of al, to transform the initial solution to a pH of 5 and, in a second step, to incrèse from a pH of 5 to a pH of 7 (FIG. 5). If this process is carried out with pellets of a degree of crosslinking of 2%, $C_T=38$ g/100 mL and an effective concentration of 15 g/L with pellets of 1 mm diameter, the time used in the first step is 1 hour and that used in the second step is 20 minutes.

Figure 1:
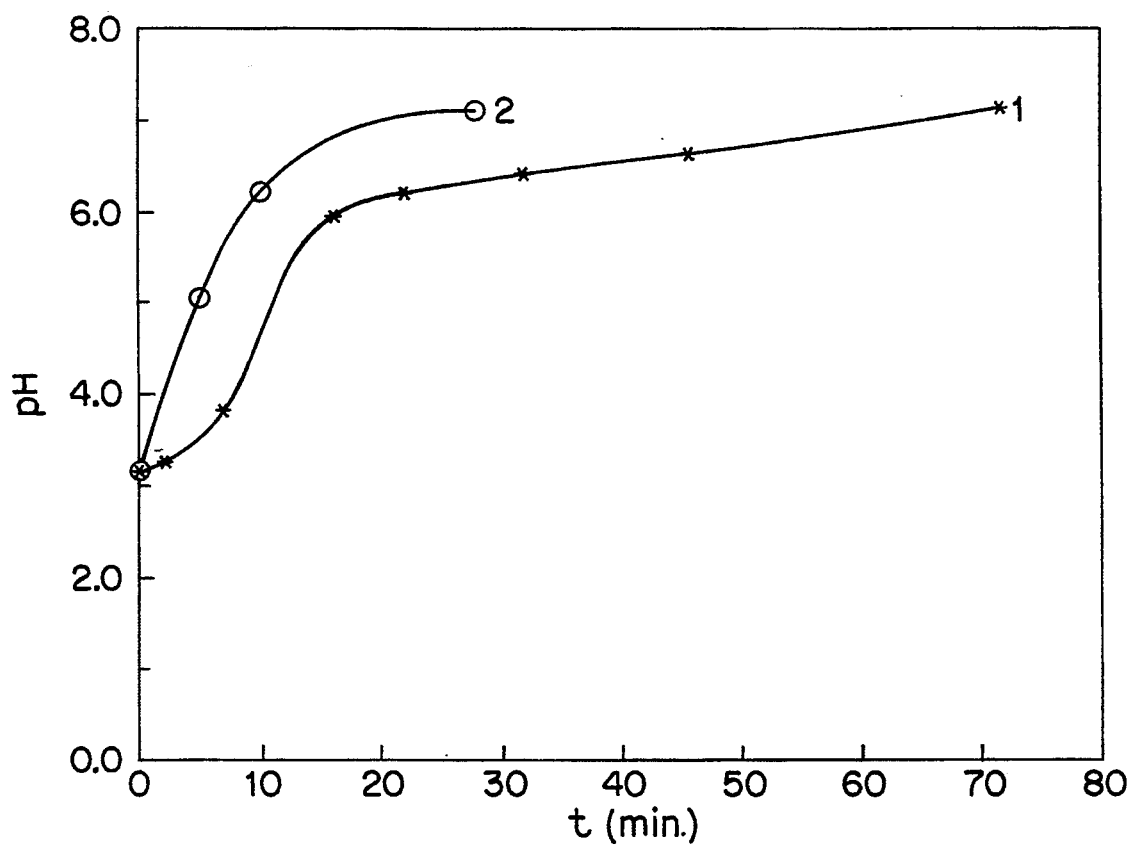
FIG. 1 Variation of the pH of two aliquot parts of an aqueous $10^{-3}$ M HCl solution with time (in minutes) when pellets of different mass are introduced into them. Line 1 corresponds to an effective concentration of 12.5 g/L, and line 2 to 25 g/L, and in both cases the diameter of the pellets is of the order of 1 mm, $C_T=40$ g/100 mL, and $C=2\%$.
Figure 2:
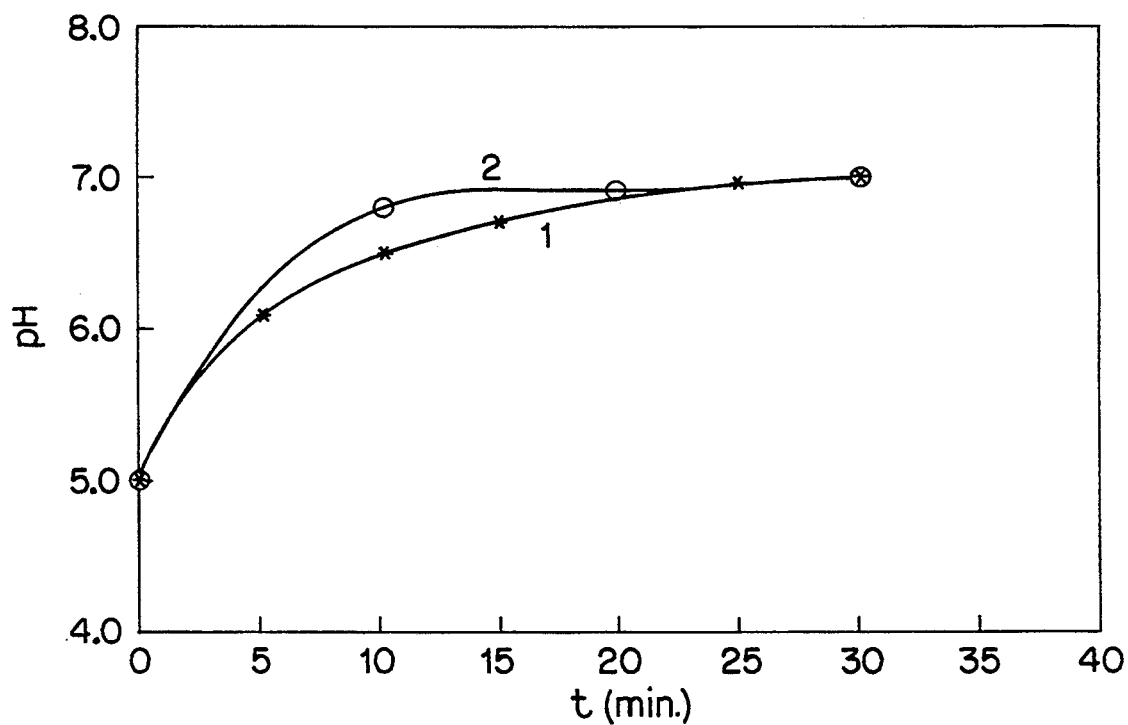
FIG. 2 Variation of the pH of two aliquot parts of an aqueous $10^{-5}$ M HCl solution with time (in minutes) when a pellet of the same mass (15 g/mL effective concentration) and different composition is introduced into each of them. Line 1 corresponds to $C=4\%$ and line 2 to $C=2\%$, and in both cases $C_T=40$ g/100 mL.
Figure 3:
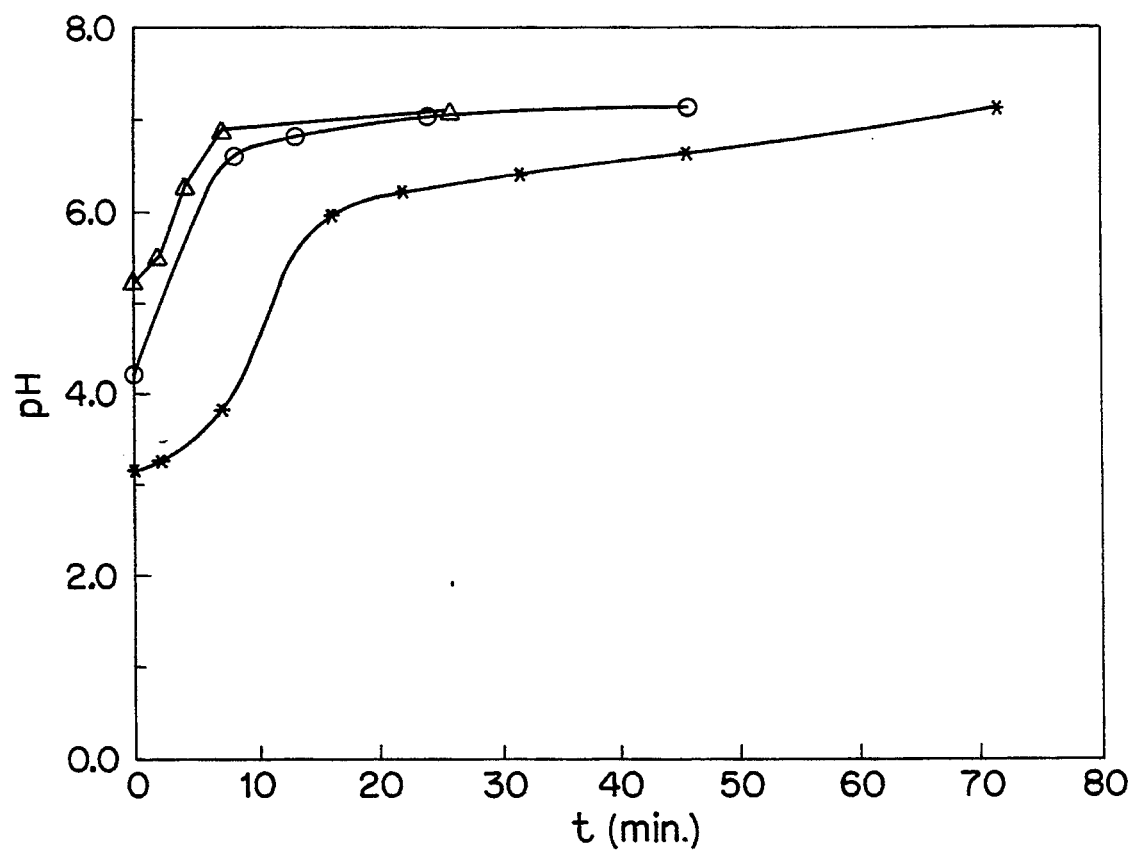
FIG. 3 Variation with time (in hours) of the pH of three aqueous solutions of HCl of different initial pH when introducing into them pellets of 1 mm diameter with an effective concentration of 12.5 g/L and the same composition as the gels of FIG. 1.
Figure 4:
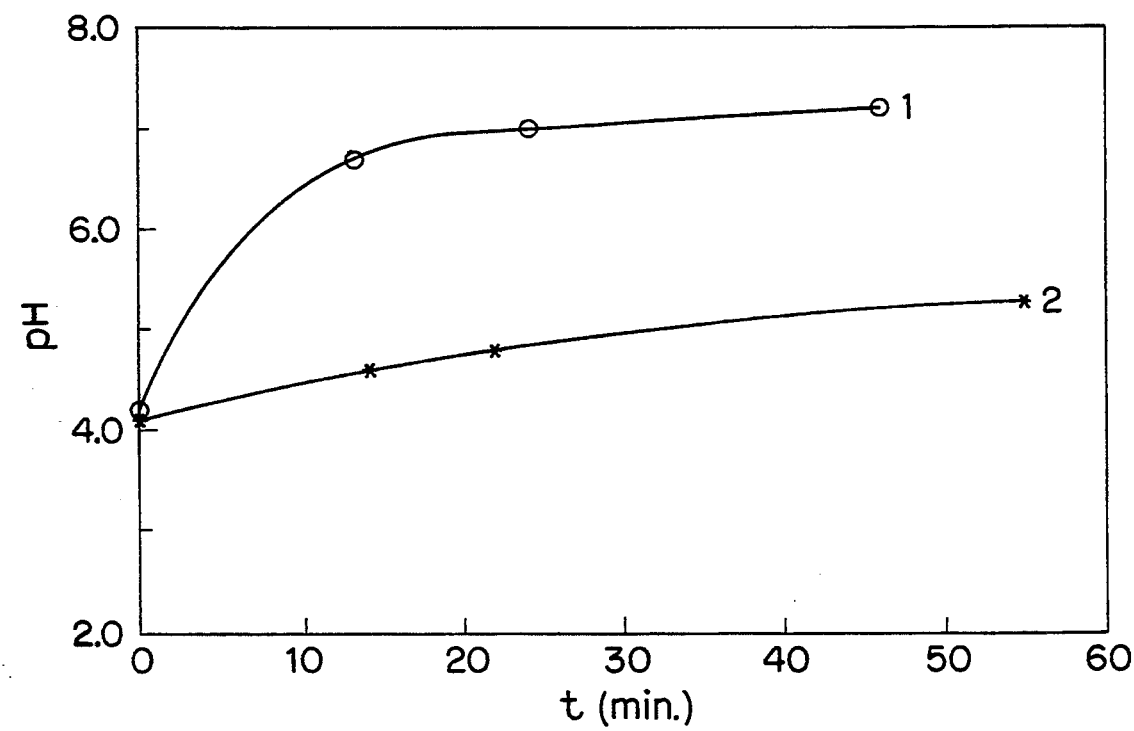
FIG. 4 Variation of the pH of two aliquot parts of an aqueous $10^{-4}$ M HCl solution when using astilles of a diameter of 1 mm (line 1) and pellets of a diameter of 10 mm (line 2). The gels have the same composition as in the preceding figures.
Figure 5:
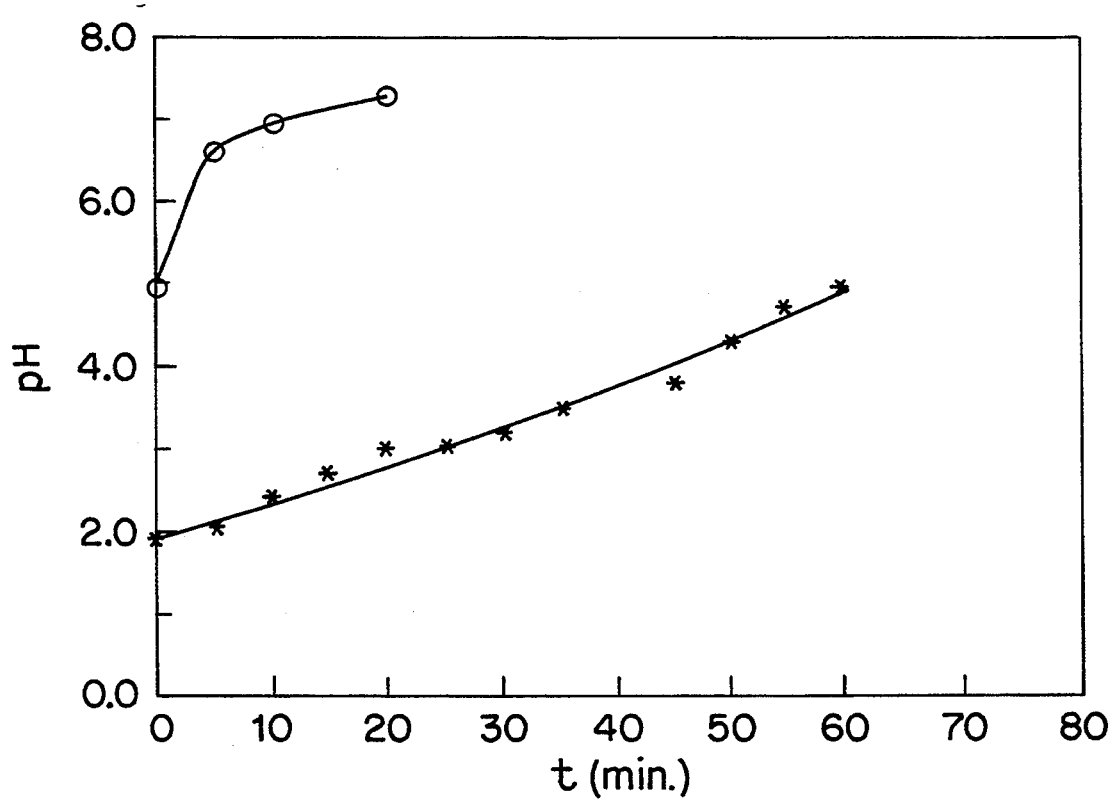

We claim:

1. Crosslinked water-insouble pH regulating polyvinylimidazole hydrogel pellets having a swelling index of about 10 grams of water per gram of dry hydrogel, said hydrogel consisting essentially of about 95-98% by weight, based on the total weight of monomers, of N-vinylimidazole and about 2-5% by weight, based on the total weight of monomers, of a water soluble polymerizable divinyl crosslinking comonomer that is copolymerizable with the N-vinylimidazole.

2. Crosslinked pH regulating hydrogel according to claim 1 wherein the crosslinking agent is N,N'-methylene-bis-acrylamide.

* * * * *